United States Patent [19]

Ramun et al.

[11] 4,403,431
[45] Sep. 13, 1983

[54] SELF-CONTAINED MATERIAL HANDLING AND SHEARING ATTACHMENT FOR A BACKHOE

[76] Inventors: Michael Ramun; John Ramun, both of 2100 Poland Ave., Youngstown, Ohio 44502

[21] Appl. No.: 399,734

[22] Filed: Jul. 19, 1982

[51] Int. Cl.³ .......................... E02F 3/76; B23P 19/00
[52] U.S. Cl. .................................... 37/117.5; 30/134; 144/34 E; 414/740
[58] Field of Search ................ 37/117.5, 103, DIG. 3; 30/134, 228, 231; 414/740; 144/34 E

[56] References Cited

U.S. PATENT DOCUMENTS

| | | | |
|---|---|---|---|
| 3,530,576 | 9/1970 | Reichborn | 30/134 |
| 3,814,152 | 6/1974 | Pallari | 144/34 E |
| 4,058,915 | 11/1977 | Hake | 37/117.5 |
| 4,104,792 | 8/1978 | Labounty | 30/134 |
| 4,131,210 | 12/1978 | Everson | 414/740 |
| 4,151,868 | 5/1979 | Fischer | 144/34 E |
| 4,188,721 | 2/1980 | Ramun et al. | 30/134 |
| 4,198,747 | 4/1980 | Labounty | 30/228 X |
| 4,217,000 | 8/1980 | Watanabe | 144/34 E |
| 4,313,479 | 2/1982 | Coughran, Jr. | 144/34 E |

*Primary Examiner*—E. H. Eickholt
*Attorney, Agent, or Firm*—Harpman & Harpman

[57] ABSTRACT

A self-contained material handling and shearing attachment for a backhoe enables the backhoe to be used in grasping and moving structural beams, pipes, cables, and the like, and pivotally positions a cutting blade in the form of a hook on the end of a backhoe boom for actuation by a self-contained piston and cylinder assembly. A fixed blade is secured to the attachment forming a shear point between the movable cutting blade and the fixed blade. The fixed and movable blades are shaped and positioned relative to their pivotal engagement to move objects being sheared towards the blade's pivotal engagement rather than away therefrom and does not require the use of the piston and cylinder of the backhoe as is known in prior art shears.

6 Claims, 4 Drawing Figures 4,403,431

SELF-CONTAINED MATERIAL HANDLING AND SHEARING ATTACHMENT FOR A BACKHOE

BACKGROUND OF THE INVENTION (1) Technical Field

This invention relates to attachments for backhoes as commonly used in industry and particularly in dismantling industrial buildings.

(2) Description of the Prior Art

Prior art devices are best represented in our U.S. Pat. No. 4,188,721 which shows a backhoe attachment for cutting and moving cables or the like.

Other prior art is represented by U.S. Pat. No. 4,198,747, which discloses a hydraulic shear for a backhoe in which a pair of fixed blades are arranged in spaced relation and a movable blade is arranged for movement therebetween in a shearing action.

In the present invention, a single fixed blade and a single movable blade are positioned on the end of a support structure having its own piston and cylinder assembly. The device is workable in cutting large sections of steel beams, pipes, and the like, in a shearing action with the material between the blades being guided up towards the pivot point and then sheared. The arrangement of a guide slot positioned in spaced relation to the fixed blade and in which a hook-shaped blade extension engages and moves prior to an actual shearing operation helps maintain the shearing action of the device and insures retention of the material between said blades.

SUMMARY OF THE INVENTION

A self-contained material handling and shearing attachment for a backhoe comprises a fixed blade secured to the attachment having a movable hook-shaped cutting blade pivoted thereto positioned on the end of a support channel secured over a backhoe boom in place of a normal bucket. A hydraulic piston and cylinder assembly secured to the support channel is pivotally secured to the cutting blade and connected to the hydraulic system of the backhoe. A blade guide is positioned in spaced relation to the fixed blade and forms a means for confining the movable blade to a path alongside the fixed blade where it will operate to cut material in a scissors-like shearing action when it is moved by the hydraulic piston and cylinder.

DESCRIPTION OF THE PREFERRED EMBODIMENT

Figure 1:
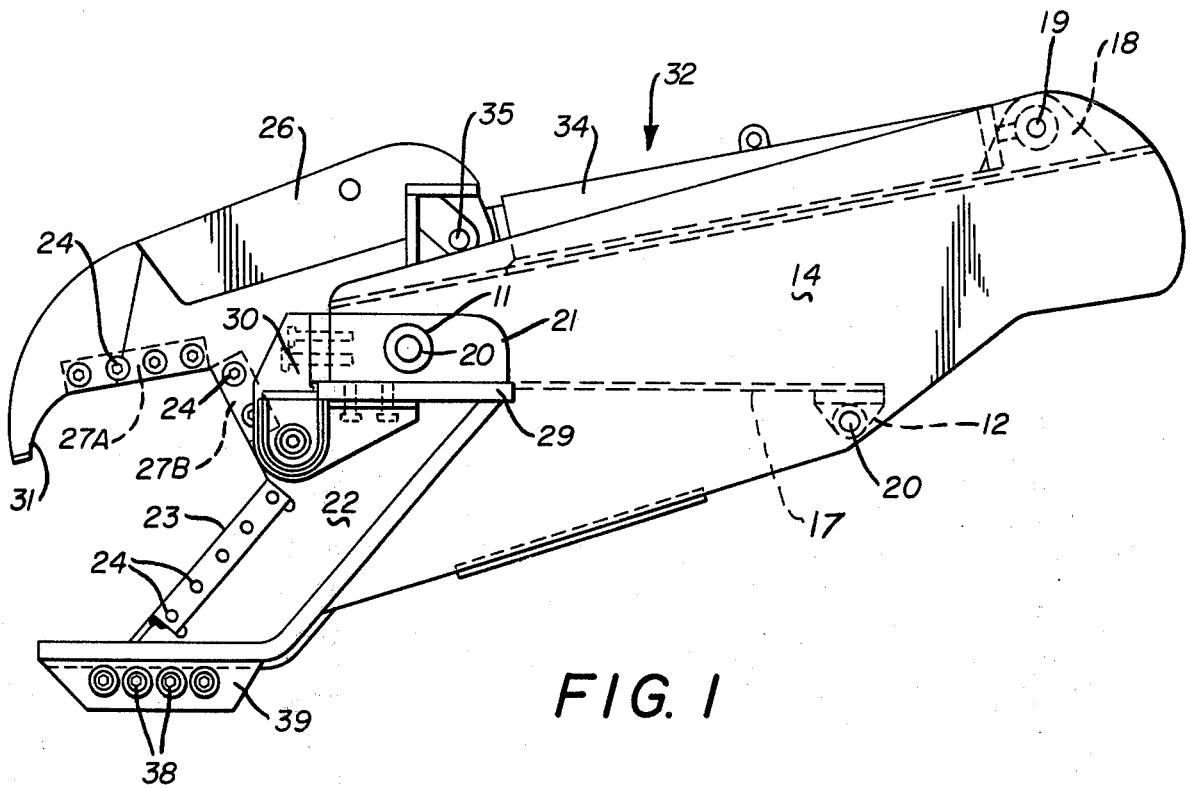
FIG. 1 is a side elevation of the self-contained material handling and shear attachment with the hook-shaped blade in opened position.

Backhoes such as used in industry are powered machines having an extensible boom with hydraulic control cylinders mounted thereon. A bucket is normally attached to the end of the boom and is moved by one or more hydraulic piston and cylinder assemblies.

Applicant's device is an attachment for a backhoe that is used in placed of the bucket and hydraulic piston and cylinder assemblies of the backhoe for handling and shearing and moving structural beams, pipes, cables and other structural members and the like normally found in structures being dismantled.

As will be seen in the drawings, a backhoe boom 10 has a transverse pivot 11 positioned therethrough near its outer end and an apertured lug 12 on the lower portion of the boom 10 inwardly of the outer end. A mounting body 13 is comprised of a pair of spaced parallel upstanding plates 14 and 15 secured together by a horizontally disposed longitudinally extending member 16 therebetween inwardly of the plates' upper edges. A secondary member 17 is positioned between the upstanding plates 14 and 15 inwardly of their lower edges. A portion of the longitudinally extending member 16 is cut away at one end with a pair of spaced apertured lugs 18 secured to the longitudinally extending member 16 abutting the vertically upstanding plates 14 and 15 on its opposite end. A support pivot 19 is positioned through the apertured lugs 18. The mounting body 13 is secured over and on the boom 10 as illustrated in FIG. 2 of the drawings by fasteners 20 positioned therethrough and through the apertured lug 12 and by spaced apertured plates 21 on the mounting body 13 engaged on the pivot 11 which can take the form of a suitable bolt and nut assembly.

The mounting body 13 carries a blade supporting body member 22 to which a hardened steel blade 23 is attached by several fasteners 24 and a pair of spaced parallel angular guides 25 are attached to the blade supporting body 22 parallel to the blade 23 so as to form an elongated slot S into which a portion of a hook-shaped cutting blade 26 may move in a scissors-like shearing action relative to the fixed blade 23. The hook-shaped cutting blade 26 has a pair of hardened steel blades 27A and 27B attached by a plurality of fasteners 24 and is pivotally mounted on the mounting body 13 by a pivot pin 27 engaged in spaced brackets 28 which are in turn attached to the sides 14 and 15 of the mounting body 13 by a secondary support plate 29. The hardened steel blades 27A and 27B are positioned in angular relation to one another, which when engaged against the hardened steel blade 23 define a generally triangular space therebetween. (See FIG. 1).

A bolt on hub 30 forms the actual point of pivotal engagement with the pin 27 and with the bolt hub 30 being positioned on the side of the hook-shaped cutting blade 26 opposite the fixed cutting blade 23 so the hub can be removed providing easy access for removal of the hook-shaped cutting blade 26. The improved configuration of the hook-shaped cutting blade 26 and hardened steel blades positioned thereon is important to the operation of the device as the portion of the blade 26 beyond the hardened cutting edge portions 27 curves outwardly and upwardly with respect to the cutting blade portion 27B to form a relatively large hook-shaped end 31 which will engage and substantially register with the slot S between the spaced parallel angularly disposed guides 25 considerably before the cutting edge portion 27B of the blade comes into a gathering and shearing action with respect to an article therein to be sheared.

Figure 2:
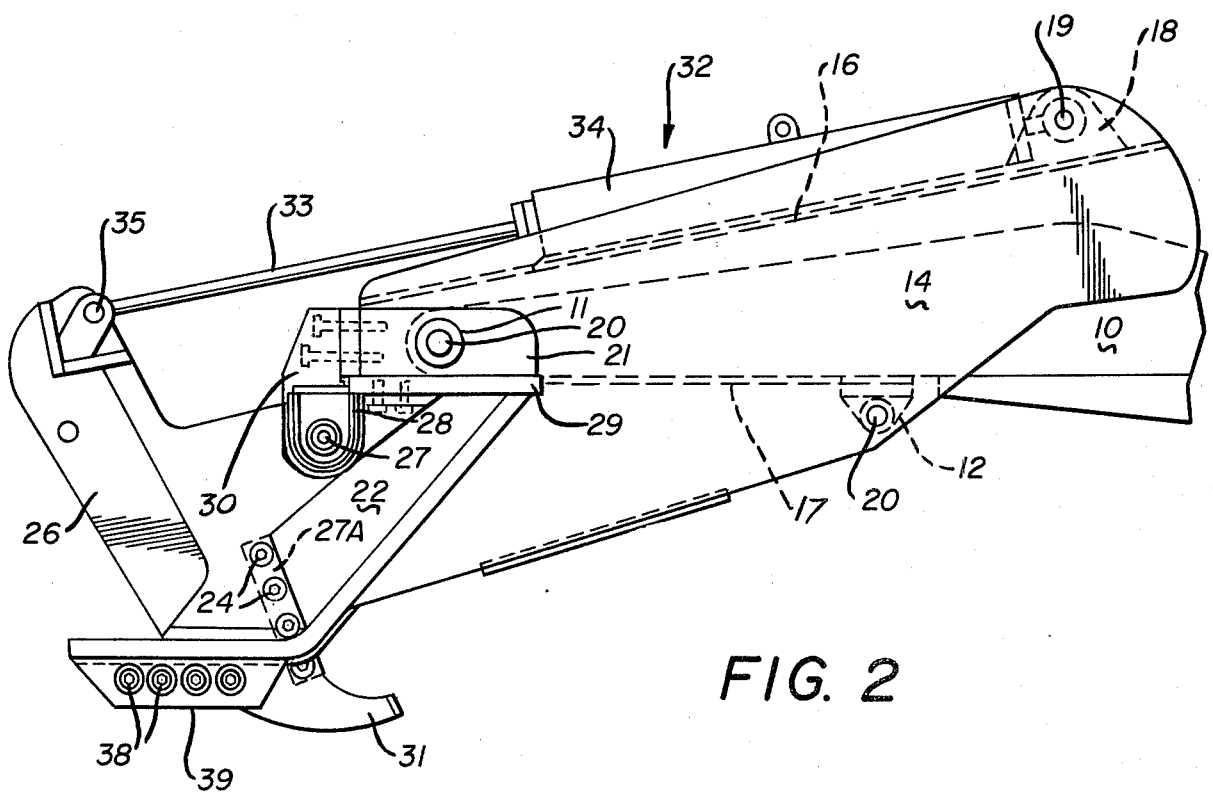
FIG. 2 is a side elevation of the self-contained material handling and shear attachment with the hook-shaped blade in closed position.
Figure 3:
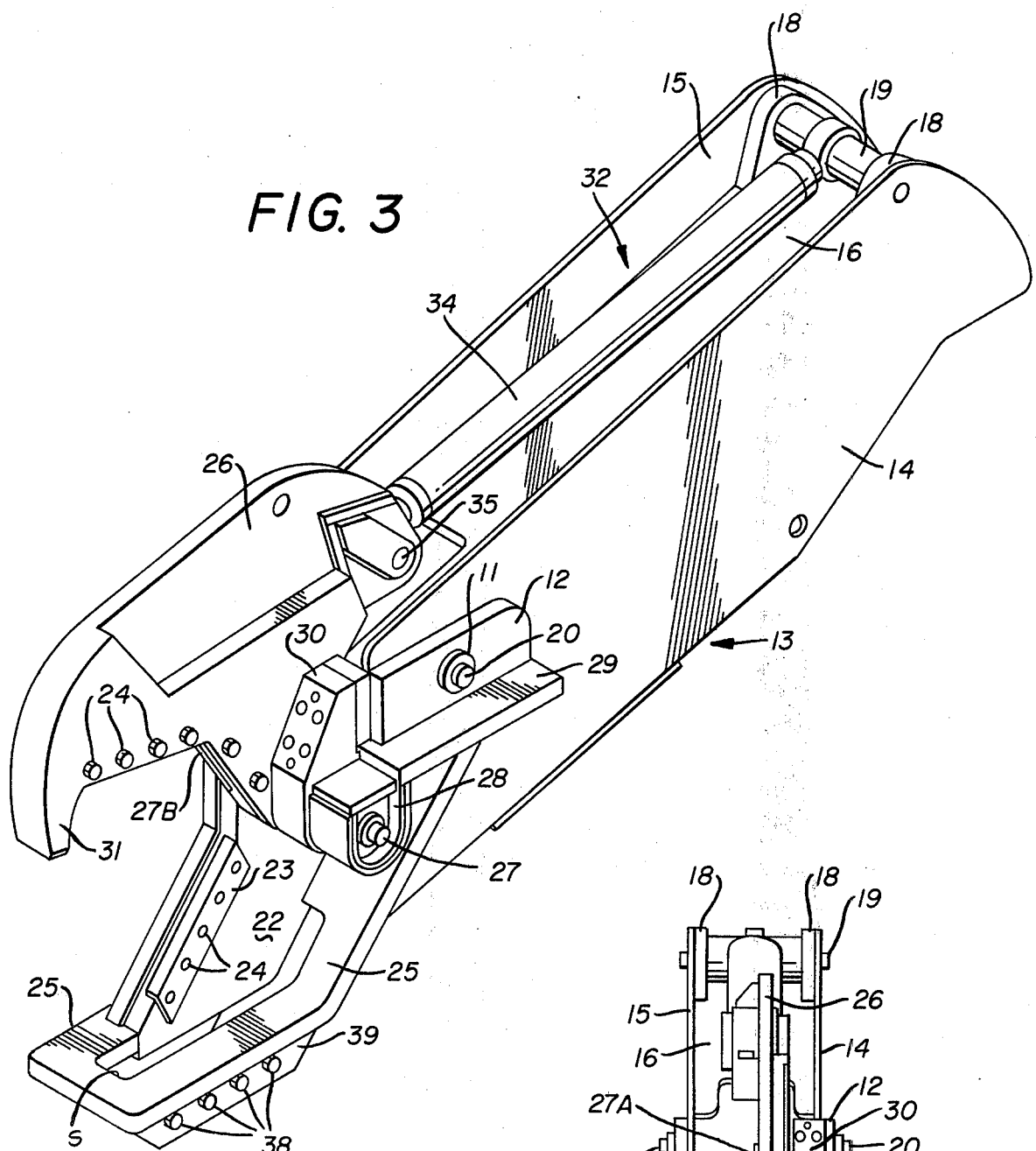
FIG. 3 is a front perspective view of the self-contained material handling and shear attachment with the blade in opened position.

In FIG. 1 of the drawings, the hook-shaped cutting blade 26 is shown in opened position and it will be observed that due to the hook-shaped end 31 thereof, the attachment may be used to grasp and hold and pull and/or lift beams, pipes, cables, or the like, to be moved and sheared and that upon closing the hook-shaped cutting blade 26 as seen in FIG. 2 of the drawings, the material will be forced upwardly towards the point of pivotal engagement of the blades and held against movement away from the blade area during the shearing action as the blades 27A to 23 close in a shearing action at a point of maximum load as defined adjacent the pivot pin 27.

In order that the hook-shaped cutting blade 26 can be moved in a material grasping, holding or pulling or shearing action, a piston and cylinder assembly 32 is used and is positioned within the area defined by the vertical upstanding members 14 and 15 and the longitudinally extending member 16. The piston and cylinder assembly 32 includes a piston rod 33 and a cylinder 34 pivotally attached to a bracket 35 on the end of the hook-shaped cutting blade 26 opposite the hook portion 31 and the support pin 19 respectively.

Figure 4:
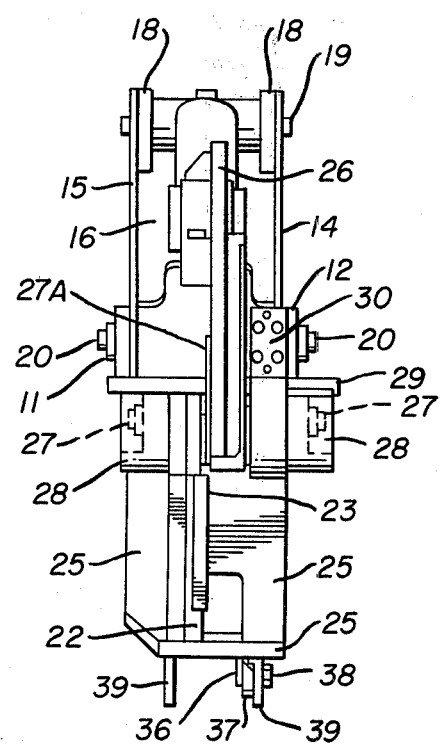
FIG. 4 is an end elevation thereof.

Referring now to FIGS. 2 and 4 of the drawings, the spaced, parallel guides 25 defining the elongated slot S therebetween has on one guide an adjustable wear plate 36 supported by a plurality of shims 37 and secured to the spaced, parallel, angular guides 25 by fasteners 38 through an apertured bracket 39 extending therefrom. The wear plate 36 is adjusted outwardly as wear is incurred by the hook-shaped cutting blade 26 as it passes therebetween.

The efficiency of the shearing attachment is further enhanced by the right angular disposition of the cutting blade 26 to the backhoe boom 10. The cutting blade 26 in open position is generally parallel in relation to the boom 10 with the supporting body member 22 and the blade 23 at an angle less than 90 to the boom 10. The cutting blade 26 in closed position is nearly at a right angle to the mounting body 13.

The device of the present disclosure is similar to that of our U.S. Pat. No. 4,188,721 and a pending application and comprises an improvement with respect thereto particular with respect to the mounting arrangement wherein the self-contained attachment defines a pocket into which the boom of a backhoe with the bucket removed can be received and secured easily. The attachment has its own hydraulic piston and cylinder assembly for actuation of the movable cutting blade thereon, requiring only to be connected to the hydraulic system of the backhoe.

The construction is such that the device can and does handle beams, pipes, cables and other structural members that were incapable of being handled by devices of our U.S. Pat. No. 4,188,721 and providing a self-contained attachment that can be easily and quickly attached to a variety of backhoe booms without utilizing the hydraulic piston and cylinder assemblies on the boom normally used to activate the bucket and the shearing blade of the prior art devices.

Although but one embodiment of the present invention has been illustrated and described, it will be apparent to those skilled in the art that various changes and modifications may be made therein without departing from the spirit of the invention and having thus described our invention what we claim is:

1. An improvement in a cutting and manipulating attachment for a backhoe, the bucket of which has been removed and having a boom and means for moving the boom; the improvement comprising a mounting body defining an elongated cavity arranged to receive a portion of said boom, means for attaching said mounting body to said boom, an elongated movable cutting blade having a pair of cutting edges arranged in a V-shape on a common plane parallel with said cutting blade, said cutting edges positioned in shearing relation to a fixed cutting blade on said mounting body, means pivotally mounting said elongated cutting blade on said mounting body in pivotal relation to said fixed cutting blade with at least one of said cutting edges arranged in approximately parallel spaced relation to said fixed cutting blade when said elongated movable cutting blade is in substantially open relation thereto, means on said mounting body for keeping said elongated movable cutting blade in shearing relation to said fixed cutting blade consisting of spaced parallel guides adjacent said fixed cutting blade defining an elongated guide path for a portion of said movable elongated cutting blade, a piston and cylinder positioned on said mounting body and pivotally connected to said movable cutting blade so that the same can be moved relative to said fixed body thereby.

2. The improvement in a cutting and manipulating attachment for a backhoe set forth in claim 1 wherein said mounting body defining said elongated cavity comprises spaced parallel upstanding plates and a member securing said plates together.

3. The improvement in a cutting and manipulating attachment for a backhoe set forth in claim 2 wherein said member securing said plates together has a portion cutaway and means for pivotally securing said piston and cylinder to said member.

4. The improvement in a cutting and manipulating attachment for a backhoe set forth in claim 3 wherein said means for pivotally securing said piston and cylinder assembly to said member comprises a pair of spaced apertured lugs located on said member and a pivot pin engaging the same and the cylinder.

5. The improvement in a cutting and manipulating attachment for a backhoe set forth in claim 1 wherein said means for attaching said mounting body to said boom comprises detachable fasteners engaging said mounting body and said boom.

6. The improvement in a cutting and manipulating attachment for a backhoe set forth in claim 1 and wherein said portions of said angular guides are parallel with said fixed cutting blade and have angular extensions downwardly and outwardly thereof defining a path, said elongated movable cutting blade having a curved free end defining said cutting blade, the curved free end being arranged to initially engage between said parallel guides in advance of the engagement of a V-shaped cutting edge with said fixed cutting blade.

* * * * *